US010054279B2

(12) United States Patent
Kliebisch

(10) Patent No.: US 10,054,279 B2
(45) Date of Patent: Aug. 21, 2018

(54) ILLUMINATION DEVICE FOR VEHICLES

(71) Applicant: Hella KGaA Hueck & Co., Lippstadt (DE)

(72) Inventor: Dirk Kliebisch, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 138 days.

(21) Appl. No.: 15/044,199

(22) Filed: Feb. 16, 2016

(65) Prior Publication Data

US 2016/0281952 A1 Sep. 29, 2016

(30) Foreign Application Priority Data

Mar. 25, 2015 (DE) ........................ 10 2015 104 514

(51) Int. Cl.

| | |
|---|---|
| ***B60Q 1/00*** | (2006.01) |
| ***F21S 8/10*** | (2006.01) |
| ***F21S 41/143*** | (2018.01) |
| ***F21S 41/20*** | (2018.01) |
| ***F21S 41/24*** | (2018.01) |
| ***F21S 41/663*** | (2018.01) |

(52) U.S. Cl.

CPC ......... *F21S 48/1241* (2013.01); *F21S 41/143* (2018.01); *F21S 41/24* (2018.01); *F21S 41/285* (2018.01); *F21S 41/663* (2018.01)

(58) Field of Classification Search

CPC ............... F21S 48/1241; F21S 48/1154; F21S 48/1225; F21S 48/1747; F21S 48/12; F21S 48/1208; F21S 48/125; F21S 48/1266; F21S 48/1275; F21S 48/1705; F21S 48/115; F21S 41/24; F21S 41/663; F21S 41/143; F21S 41/285

See application file for complete search history.

(56) References Cited

U.S. PATENT DOCUMENTS

2010/0226144 A1* 9/2010 Stade et al. ......... F21S 48/1266 362/538

2010/0264824 A1* 10/2010 Gotz et al. ........... F21S 48/1154 362/509

(Continued)

FOREIGN PATENT DOCUMENTS

DE 10 2005 041 234 3/2007

DE 10 2008 005 488 7/2009

(Continued)

*Primary Examiner* — Y M. Lee

(74) *Attorney, Agent, or Firm* — Husch Blackwell LLP

(57) ABSTRACT

An illumination device for vehicles with a first light module for producing a first light distribution and with a second light module for producing a second light distribution. The second light module has numerous semiconductor-based light sources arranged as a matrix, a primary optics unit with primary optical elements assigned to each of the light sources and a secondary optics unit. An intermediary optics unit is arranged between the primary optics unit and the secondary optics unit of the second light module; the intermediary optics unit is designed so that a light-intensity gradient of the second light distribution gradually diminishes in a vertical and/or horizontal direction in a lower subarea, in which the first light distribution of the first light module connects or overlaps with an upper subarea.

9 Claims, 3 Drawing Sheets

(56) References Cited

U.S. PATENT DOCUMENTS

| | | | | |
|---|---|---|---|---|
| 2013/0094234 | A1* | 4/2013 | Kloos ................. | F21S 48/1241 362/511 |
| 2015/0124469 | A1* | 5/2015 | Krenn et al. ........ | F21S 48/1747 362/511 |
| 2016/0116662 | A1* | 4/2016 | Sato ........................ | F21S 41/24 362/520 |

FOREIGN PATENT DOCUMENTS

| | | |
|---|---|---|
| DE | 10 2008 036 193 | 2/2010 |
| DE | 10 2009 010 558 | 8/2010 |
| DE | 10 2011 002 336 | 10/2012 |

* cited by examiner

ILLUMINATION DEVICE FOR VEHICLES

CROSS REFERENCE

This application claims priority to German Application No. 10 2015 104514.1, filed 25 Mar. 2015, the entirety of which is hereby incorporated by reference.

FIELD OF THE INVENTION

The invention concerns an illumination device for vehicles with a first light module for producing a first light distribution and with a second light module for producing a second light distribution, whereby the second light module has numerous semiconductor-based light sources arranged as a matrix, a primary optics unit with primary optical elements assigned to each of the light sources and a secondary optics unit.

BACKGROUND OF THE INVENTION

Familiar from DE 10 2008 005 488 A1 is an illumination device for vehicles with a light module for producing a specified light distribution; a primary optics unit is provided for this such that light is expanded in the horizontal direction. The light distribution shown on a measurement screen is composed of numerous quadratic light spots, whereby vertical light/dark boundaries of adjacent light spots are adjacent to each other or overlap. This produces a homogeneous light distribution through a single light module.

Familiar from DE 10 2008 036 193 A1 is an illumination device for vehicles that has numerous light modules for producing a specified light distribution. A first light module is for producing a low-beam light distribution. A second light module is for producing a high-beam light distribution. A third light module is for producing a central area of the light distribution (additional spot). The third light module has not only LED light sources arranged as a matrix, but also a primary optics unit and a secondary optics unit. Combining these three light distributions allows for the focus of the light distribution to be changed as desired, particularly when driving in a curve. When the second light module is configured as a matrix system with numerous semiconductor-based light sources arranged as a matrix, it turns out that inhomogeneities arise in a border crossing between the first light distribution and the second light distribution. This leads to the total light distribution, which is superimposed from the first light distribution and the second light distribution, having relatively large light-intensity gradients, which are perceived as disruptive, in a border area between the first light distribution and the second light distribution.

SUMMARY OF THE INVENTION

Therefore, the task of the invention is to enhance an illumination device for vehicles with a first light module and with a matrix-based second light module such that inhomogeneities in a border area between a first light distribution caused by the first light module and a second light distribution caused by the second light module are reduced or eliminated.

To solve this task, the invention is characterized by having an intermediary optics unit arranged between the primary optics unit and the secondary optics unit of the second light module. This intermediary optics unit is configured so that a light-intensity gradient of the second light distribution gradually diminishes in a vertical and/or horizontal direction in a lower subarea, in which the first light distribution of the first light module connects or overlaps with an upper subarea.

In accordance with the invention, an intermediary optics unit is arranged between the primary optics unit and the secondary optics unit of a second light module; by means of this intermediary optics unit a light-intensity gradient is continuously diminished in a lower border area or subarea of the second light distribution. The light-intensity gradient of the second light distribution is diminished in this area not abruptly or erratically, but in the shape of a loop or bow, which preferably has an inflection point. This provides the advantage of allowing for beneficial exclusion of horizontal light/dark boundaries as termination of the second light distribution.

In accordance with a preferred embodiment of the invention, the intermediary optics unit is configured so that the light-intensity gradient in the area of vertical light/dark boundaries is softened by vertical glare protection strips when the second light distribution is composed of vertical light strips and the light sources of the second light module can be switched on or off, depending on a sensor that scans the field ahead of the vehicle or a traffic area. A beneficial result of this can be the production of a homogeneous transition in the horizontal direction between the dark vertical glare protection strip and the adjacent light strip.

In accordance with a further development of the invention, the intermediary optics unit has a lens with scattering optical elements that are preferably configured as buffer optical elements. A beneficial result of this can be softening of the light-intensity gradient in a horizontal and vertical direction in a simple way.

In accordance with a further development of the invention, the primary optics unit is formed by a one-piece light conductor with numerous fiber-optic fingers protruding in the direction of the respective light sources. The fiber-optic fingers are arranged horizontally in rows. An upper row of light fingers is assigned to the intermediary optics unit, so that a "softening" of the light-intensity gradients arises in a lower subarea of the second light distribution.

In accordance with a further development of the invention, the intermediary optics unit is mounted on a frame-shaped carrier, on which the primary optics unit is also mounted. A beneficial result of this can be easy integration of the intermediary optics unit into an existing design of the second light module.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
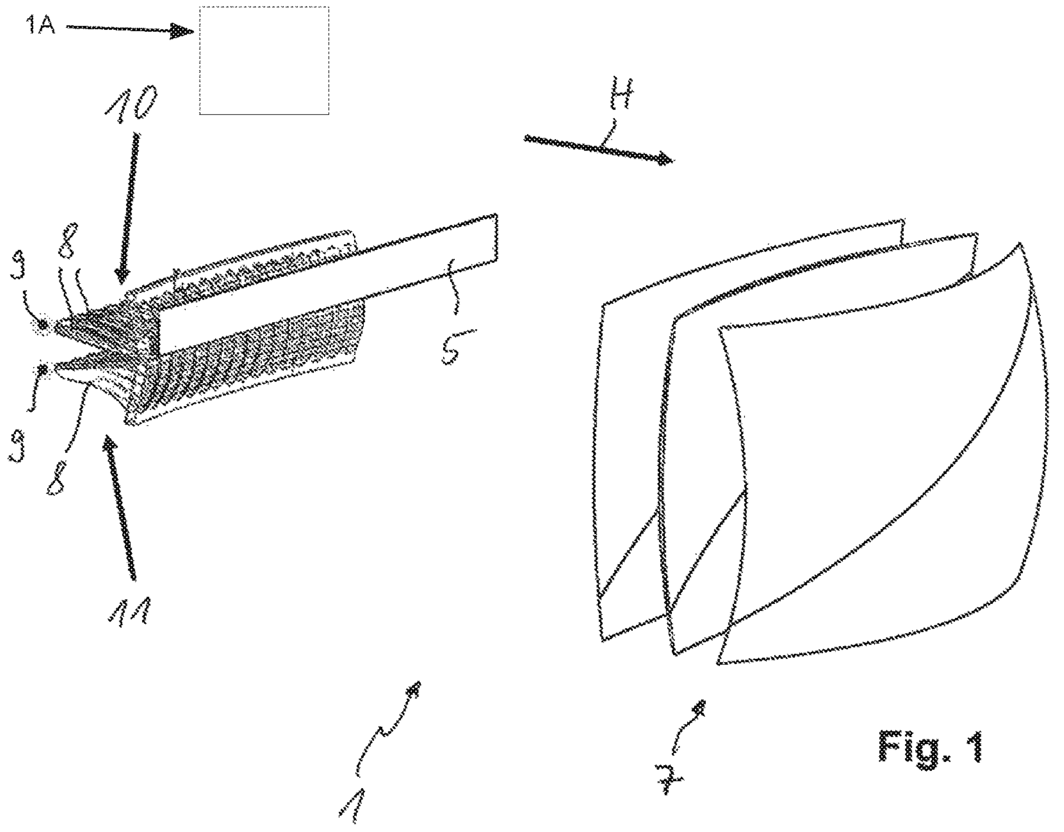
FIG. 1 shows a perspective drawing of a second light module of an illumination device designed as a matrix.

An illumination device for vehicles is configured as a headlight that can, for example, produce a glare-free high-beam light distribution. A first light module 1*a*, pictured in FIG. 1, and a second light module 1, pictured in FIG. 1, are provided for producing a total light distribution. The first light module 1*a* and the second light module 1 are arranged in a common housing of the headlight. The first light module 1*a* is illustrated in FIG. 1 as upstream of the second light module 1, although it may be located anywhere relative to the second light module 1, including downstream or beside the second light module 1, so long as it produces the patterns described below.

Figure 3A:
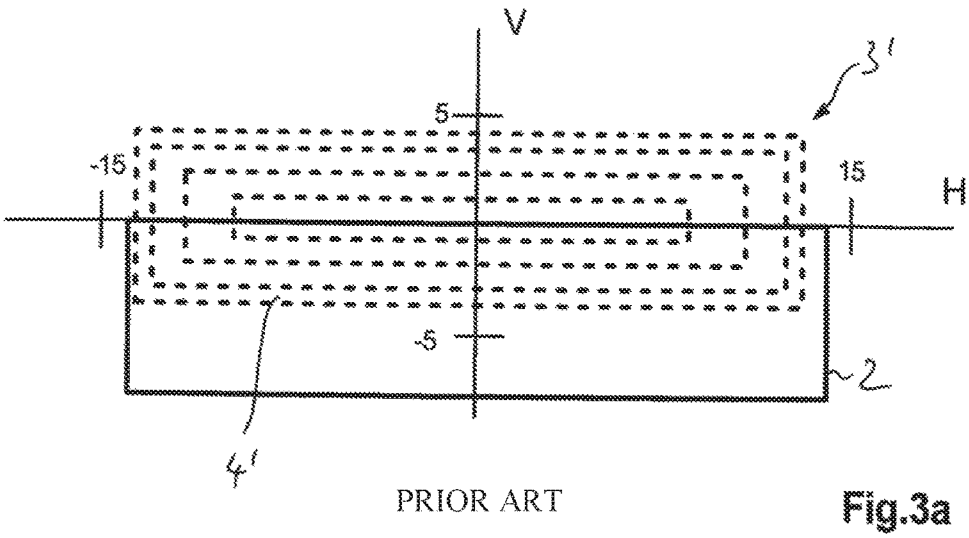
PRIOR ART Fig.3a
FIG. 3*a* shows a schematic light distribution of the illumination device with a first light distribution (solid line) and a second light distribution (dashed line) without an intermediary optics unit (state of the art of technology).

The first light module can consist of a semiconductor-based light source and a reflector. Alternatively, the first light module can also have a semiconductor-based light source and a lens positioned before this in the beam direction. If necessary, multiple first light modules can also be provided instead of a single first light module for producing a first light distribution 2, such as a low-beam light distribution; see the solid line in FIG. 3*a* and FIG. 3*b*.

Figure 3B:
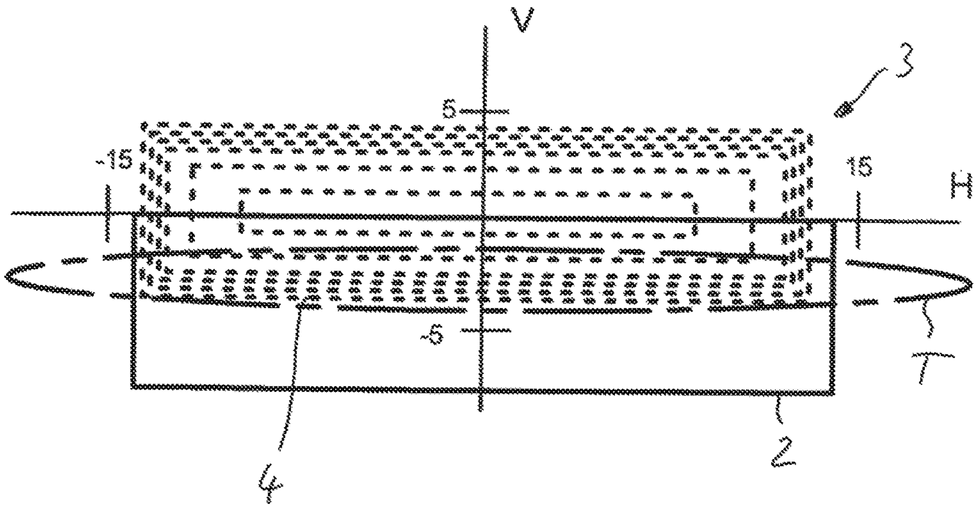
FIG. 3*b* shows a schematic light distribution of the illumination device with a first light distribution (solid line) and a second light distribution (dashed line) with an integrated intermediary optics unit that is in accordance with the invention.

The second light module 1 is for producing a second light distribution 3, which has softening of the light-intensity gradient in a lower subarea T; see the dashed line in FIG. 3*b*. This lower subarea T is located in a border area between the first light distribution 2 and the second light distribution 3. This subarea T is located in a lower overlapping area between the first light distribution 2 and the second light distribution 3, and is located below a horizontal zero line. The homogeneity of illumination of a field ahead of the vehicle essentially caused by the first light distribution 2 is improved in this way.

As can be seen from FIG. 3*b*, a horizontal light/dark boundary 4 of the second light distribution 3 runs with a light-intensity gradient curve that is not as large as for a known light distribution 3', which does not have an intermediary optics unit 5 provided in accordance with the invention.

The intermediary optics unit 5 is arranged in an area between a primary optics unit 6 and a secondary optics unit 7 of the second light module 1.

The primary optics unit 6 is designed as a one-piece light conductor that has a plurality of primary optical elements, in particular, light fingers 8, which each protrude opposite to the main beam direction H of light sources 9 of the second light module 1 or of a common plane of the beam in the direction of the respective light sources 9. The present implementation example provides for two horizontal rows 10, 11 of light fingers 8, whereby the light fingers 8 expand in the main beam direction H. The light fingers 8 each act as light conductors and have rectangular or square light decoupling surfaces. Since the light sources 9 can be switched on and off, the second light distribution 3 is composed of numerous vertical light strips. The secondary unit 7, which can have a single or multiple lenses, maps the light strips in the traffic area produced by the primary optics unit 6.

Figure 2:
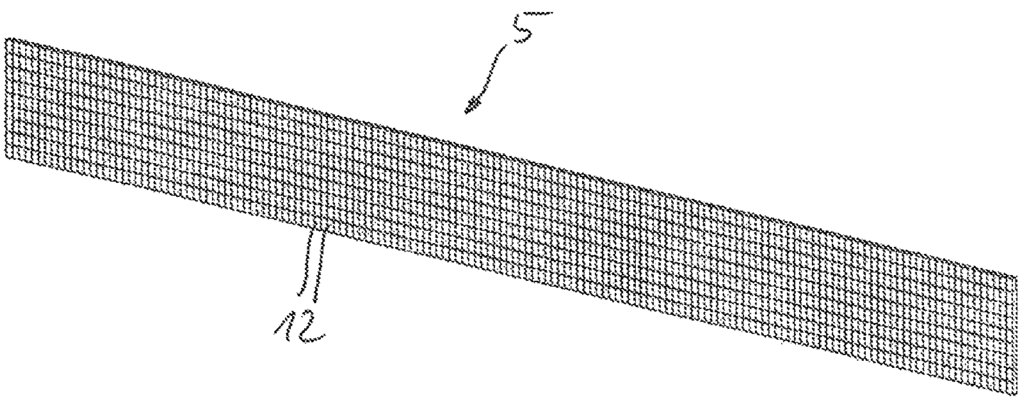
FIG. 2 shows a rear view of an intermediary optics unit of the second light module.

The intermediary optics unit 5 is designed as a lens with scattering optical elements 12. As can be seen better from FIG. 2, the scattering optical elements 12 are configured as buffer optical elements. The buffer optical elements 12 are arranged on a side that faces the primary optics unit 6. Thus they form a rear side for the intermediary optics unit 5. It is preferable to configure an even or smooth front side for the intermediary optics unit 5.

Figure 4A:
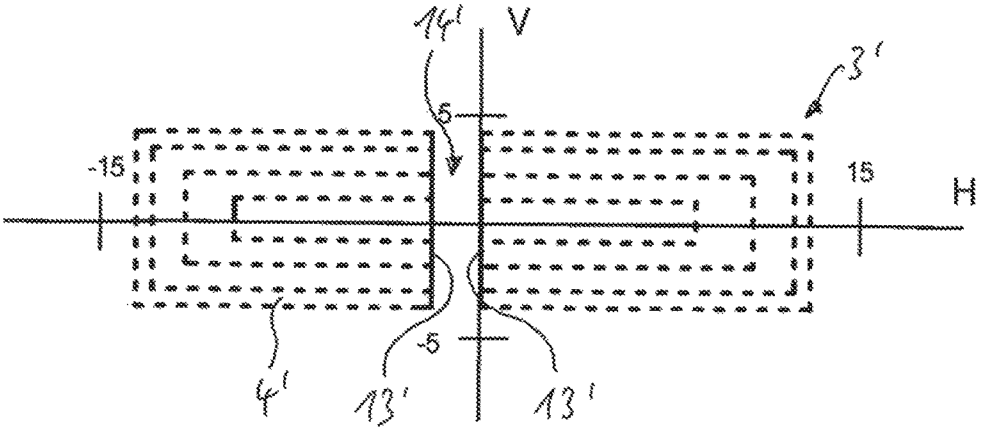
PRIOR ART Fig.4a
FIG. 4*a* shows a depiction of the second light distribution of the second light module without an intermediary optics unit that contains a glare protection strip to prevent causing glare to other road users.
Figure 4B:
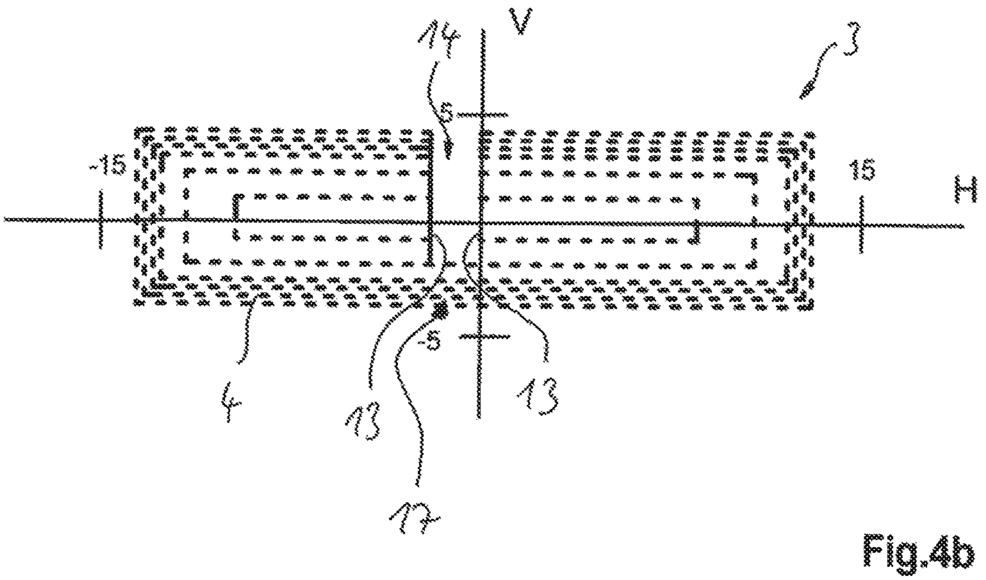
FIG. 4*b* shows a schematic second light distribution of the second light module with an intermediary optics unit that is in accordance with the invention and contains a glare protection strip to prevent blinding of other road users.

The intermediary optics unit 5 is not only meant for softening the horizontal light/dark boundary 4 at a lower edge of the second light distribution 3. The intermediary optics unit 5 preferably also causes softening of a vertical light/dark boundary 13 from the vertical light strips. As can be seen better from FIG. 4*b*, a sensor switches off one or more light sources 9 when detecting a traffic object driving ahead in the traffic area or area in front of the vehicle, so that a vertical glare protection strip 14 arises in the second light distribution 3. Compared to a second light distribution 3 of the second light module 1 without an intermediary optics unit 5, this results in both a softened vertical light/dark boundary 13 of the light strip adjacent to the glare protection strip 14 and the softened horizontal light/dark boundary 4 from the glare protection strip 14.

The vertical light/dark boundary 13 and the horizontal light/dark boundary 4 of the vertical glare protection strip 14 does not have an erratic change in light intensity, but a continuous change in light intensity. Thus the light-intensity curve in the area of the vertical light/dark boundary 13 and the horizontal light/dark boundary 4 runs continuously, for example, in the shape of a loop or bow, and preferably with an inflection point.

Reduction of the rise in the light-intensity gradient leads to the horizontal light/dark boundary 4 being broadened in a horizontal angular range between −0.5° and −3°. While a clearly delineated vertical glare protection strip 14' is formed in the case of the known second light distribution 3', the vertical glare protection strip 14 after the second light module 1 in accordance with the invention spans a range only up to −0.5°. In the area lying below −0.5° there is an overlap with the first light distribution 2.

The transition from the second light distribution 3 to the first light distribution 2 can gradually occur because the state-of-the-art vertical glare protection strip 14 is designed relatively short, which means that a light spot 17 is mapped in the lower subarea T of the second light distribution 3. Thus the total light distribution, which is composed of the first light distribution 2 and the second light distribution 3, has no inhomogeneities in the lower subarea T that would be produced by a sharp light/dark boundary 4' of the second light module 1 without the intermediary optics unit 5. In this overlapping area between the lower subarea T of the second light distribution 3 and an upper subarea of the first light distribution, which spans a vertical angular range between −0.5° and −3°, the second light distribution 3 connects to the first light distribution 2 homogeneously.

A frame-shaped carrier (not depicted) is provided for mounting the intermediary optics unit 5 in the second light module 1; the primary optics unit 6 is also mounted to this carrier.

In accordance with an alternative embodiment of the invention (not depicted), the first light distribution 2 does not have to end in an area of the horizontal H. It can run only up to the lower light/dark boundary 4 of the second light distribution 3. In this case there is no overlapping area, or a very small one, between the first light distribution 2 and the second light distribution 3.

In accordance with an alternative embodiment of the invention (not depicted), the second light distribution 3 can also run only up to the horizontal H, so that it connects directly to this above the first light distribution 2. In this case, the overlapping area between the two light distributions 2 and 3 is relatively small or does not exist.

REFERENCE NUMERAL LIST

1 2nd light module
2 1st light distribution
3, 3' 2nd light distribution
4 Horizontal light/dark boundary
5 Intermediary optics unit
6 Primary optics unit
7 Secondary optics unit
8 Light finger
9 Light sources
10 Row
11 Row
12 Scattering optical elements
13 Vertical light/dark boundary
14, 14' Vertical glare protection strips
16 Horizontal light/dark boundary
17 Light spots
T Subarea
H Main beam direction

The invention claimed is:

1. An illumination device for vehicles comprising:

a first light module for producing a first light distribution; and a second light module for producing a second light distribution, said second light module including:

numerous semiconductor-based light sources arranged as a matrix, a primary optics unit with at least one primary optical element assigned to each of the light sources and a secondary optics unit;

wherein an intermediary optics unit is arranged between the primary optics unit and the secondary optics unit of the second light module;

wherein said intermediary optics unit is configured in such a way that a light-intensity gradient of the second light distribution gradually diminishes in at least one of a vertical and horizontal direction in a lower subarea (T), in which the first light distribution of the first light module connects or overlaps with an upper subarea.

2. The illumination device in accordance with claim 1 wherein the primary optics unit has at least one primary optical element assigned to each of the light sources;

and further including a sensor for scanning a field ahead of the vehicle, and generating sensor data for controlling the light sources to switch on or based on the on sensor data to produce vertical glare protection strips with vertical light/dark boundaries on a measurement screen to prevent blinding traffic objects driving ahead of the vehicle and/or oncoming traffic; and wherein the intermediary optics unit is configured so that the light-intensity gradient gradually diminishes in the area of the vertical light/dark boundary.

3. The illumination device in accordance with claim 1 wherein the first light module produces a low-beam light distribution and the second light module produces a high-beam light distribution.

4. The illumination device in accordance with claim 1 wherein the lower subarea (T) of the second light distribution overlaps with an upper subarea of the first light distribution.

5. The illumination device in accordance with claim 1 wherein the intermediary optics unit is configured as a lens with scattering optical elements.

6. The illumination device in accordance with claim 5 wherein the scattering optical elements are configured as buffer optical elements.

7. The illumination device in accordance with claim 1 wherein the primary optics unit is configured as a one-piece light conductor with fiber-optic fingers protruding from a common plane of the beam in the direction of the respective light sources.

8. The illumination device in accordance with claim 1 wherein the primary optics unit has at least two horizontal rows of light fingers, whereby each horizontal row of light fingers is assigned to a horizontal row of light sources; and whereby the intermediary optics unit is configured so that it is assigned to an upper row of light fingers.

9. The illumination device in accordance with claim 8 wherein the intermediary optics unit at least partially overlaps the upper row of light fingers during projection onto the primary optics unit.

* * * * *